United States Patent
Uedera et al.

(10) Patent No.: US 10,471,495 B2
(45) Date of Patent: Nov. 12, 2019

(54) MATERIAL SEPARATION DEVICE AND MATERIAL SEPARATION METHOD

(71) Applicants: KOMATSU INDUSTRIES CORPORATION, Kanazawa-shi, Ishikawa (JP); AISAKU CO.,LTD, Toyota-shi, Aichi (JP)

(72) Inventors: Yusuke Uedera, Kanazawa (JP); Hiromoto Shimada, Nomi (JP); Shoichi Kambaya, Toyota (JP); Wataru Yoshimura, Aichi (JP)

(73) Assignees: KOMATSU INDUSTRIES CORPORATION, Ishikawa (JP); AISAKU CO.,LTD, Aichi (JP)

( * ) Notice: Subject to any disclaimer, the term of this patent is extended or adjusted under 35 U.S.C. 154(b) by 0 days.

(21) Appl. No.: 15/541,518

(22) PCT Filed: Jan. 21, 2016

(86) PCT No.: PCT/JP2016/051707
§ 371 (c)(1),
(2) Date: Jul. 5, 2017

(87) PCT Pub. No.: WO2016/139986
PCT Pub. Date: Sep. 9, 2016

(65) Prior Publication Data
US 2017/0348755 A1    Dec. 7, 2017

(30) Foreign Application Priority Data
Mar. 3, 2015  (JP) ................. 2015-041207

(51) Int. Cl.
*B65H 7/12*    (2006.01)
*B21D 43/24*    (2006.01)
(Continued)

(52) U.S. Cl.
CPC ............ *B21D 43/24* (2013.01); *B65G 59/04* (2013.01); *B65H 3/08* (2013.01); *B65H 3/48* (2013.01)

(58) Field of Classification Search
CPC ............ B65H 2220/01; B65H 2511/51; B65H 3/0816; B65H 2220/11; B65H 2701/1928; B65H 3/48
See application file for complete search history.

(56) References Cited

U.S. PATENT DOCUMENTS 2,086,577 A * 7/1937 Reinartz ............ B65H 3/0816
                                                    271/5
2,454,762 A * 11/1948 Belluche ................ B65H 3/48
                                                    271/11
(Continued)

FOREIGN PATENT DOCUMENTS

CN    101075105 A    11/2007
CN    101830356 A    9/2010
(Continued)

OTHER PUBLICATIONS

The Office Action for the corresponding Chinese application No. 201680005120.8, dated Feb. 8, 2018.
(Continued)

*Primary Examiner* — Gregory W Adams
(74) *Attorney, Agent, or Firm* — Global IP Counselors, LLP (57) ABSTRACT

A material separation device comprises a placement component, a blower, a suction component, a suction pad driver, and a controller. The blower blows air at a plurality of aluminum sheets that have been stacked on the placement component to float an uppermost aluminum sheet. The suction component uses suction pads to chuck and hold the uppermost aluminum sheet from above while the air is being blown. The suction pad driver drives the suction component
(Continued)

up and down, using servomotors as a drive source. The controller performs control so that the suction pads chucking the aluminum sheet are raised to a temporary stopping position by the suction pad driver, and the suction pads are stopped for a predetermined length of time at the temporary stopping position while the air is stopped, and the suction pads are then raised by the suction pad drivers to a conveyance position.

8 Claims, 6 Drawing Sheets

(51) Int. Cl.
  *B65H 3/08* (2006.01)
  *B65H 3/48* (2006.01)
  *B65G 59/04* (2006.01)

(56) References Cited

U.S. PATENT DOCUMENTS

| | | | | | |
|---|---|---|---|---|---|
| 3,409,149 | A | * | 11/1968 | Graux | B65G 59/045 271/11 |
| 4,806,071 | A | * | 2/1989 | Sartorio | B21D 43/24 271/262 |
| 5,052,672 | A | * | 10/1991 | Horii | B65H 3/0833 271/107 |
| 5,110,110 | A | * | 5/1992 | Wirz | B65H 3/48 239/587.1 |
| 5,180,156 | A | | 1/1993 | Matsui et al. | |
| 5,234,207 | A | * | 8/1993 | Lindstrom | B65H 3/48 271/106 |
| 5,295,673 | A | * | 3/1994 | Torisawa | B65H 7/12 271/104 |
| 5,676,364 | A | * | 10/1997 | Shiiki | B65H 3/0816 271/106 |
| 5,848,785 | A | * | 12/1998 | Hardwick | B23Q 7/106 271/11 |
| 6,345,818 | B1 | * | 2/2002 | Stephan | B25J 15/0052 271/106 |
| 6,349,930 | B1 | * | 2/2002 | Kruger | B65H 3/0883 271/104 |
| 6,468,025 | B1 | * | 10/2002 | Stumpf | B21D 43/24 271/18.1 |
| 6,652,217 | B2 | * | 11/2003 | Dettman | B21D 43/20 271/104 |
| 6,886,827 | B2 | * | 5/2005 | Dachtler | B65H 3/0816 271/106 |
| 7,431,281 | B2 | * | 10/2008 | Jensen | B65G 59/04 271/107 |
| 7,637,492 | B2 | * | 12/2009 | Brugge | B65H 3/0816 271/105 |
| 7,700,895 | B2 | * | 4/2010 | Komatsu | B65H 3/0833 219/216 |
| 7,891,655 | B2 | * | 2/2011 | Williams | B65H 3/0816 270/58.33 |
| 8,074,978 | B2 | * | 12/2011 | Takahashi | B65H 3/128 271/97 |
| 8,186,668 | B2 | * | 5/2012 | Wardak | B65H 3/48 271/97 |
| 2005/0036881 | A1 | | 2/2005 | Eriksson et al. | |
| 2008/0036134 | A1 | | 2/2008 | Matsumoto | |
| 2008/0246209 | A1 | | 10/2008 | Brugge | |
| 2011/0272877 | A1 | * | 11/2011 | Wardak | B65H 3/128 271/12 |
| 2013/0167350 | A1 | | 7/2013 | Kokubo et al. | |
| 2015/0170349 | A1 | | 6/2015 | Mochizuki et al. | |

FOREIGN PATENT DOCUMENTS

| | | |
|---|---|---|
| CN | 104284853 A | 1/2015 |
| DE | 602 11 690 T2 | 5/2007 |
| JP | 59-149250 A | 8/1984 |
| JP | 2-48338 A | 2/1990 |
| JP | 4-12941 A | 1/1992 |
| JP | 4-197945 A | 7/1992 |
| JP | 9-194056 A | 7/1997 |
| JP | 11-35176 A | 2/1999 |
| JP | 2000-255976 A | 9/2000 |
| JP | 2008-254930 A | 10/2008 |
| JP | 2010-194567 A | 9/2010 |
| JP | 2013-112522 A | 6/2013 |
| JP | 2015-12246 A | 1/2015 |

OTHER PUBLICATIONS

The International Search Report for the corresponding international application No. PCT/JP2016/051707, dated Apr. 12, 2016.
The Office Action for the corresponding German application No. 11 2016 000 246.7, dated Jul. 22, 2019.
The Office Action for the corresponding Chinese application No. 201680005120.8, dated Sep. 14, 2018.
The Office Action for the corresponding Japanese application No. 2015-041207, dated Sep. 25, 2018.

* cited by examiner

MATERIAL SEPARATION DEVICE AND MATERIAL SEPARATION METHOD

CROSS-REFERENCE TO RELATED APPLICATIONS

This application is a U.S. National stage application of International Application No. PCT/JP2016/051707, filed on Jan. 21, 2016. This U.S. National stage application claims priority under 35 U.S.C. § 119(a) to Japanese Patent Application No. 2015-041207, filed in Japan on Mar. 3, 2015, the entire contents of which are hereby incorporated herein by reference.

BACKGROUND

The present invention relates to a material separation device and a material separation method.

When press working is performed, for example, a material separation device is used to separate one sheet of material from a plurality of sheets of stacked material, and supply this sheet to the press device (see Japanese Laid-Open Patent Application H9-194056, for example).

The material separation device discussed in Japanese Laid-Open Patent Application H9-194056 is provided with suction pads that are driven up and down by air cylinders. The uppermost aluminum sheet is lifted upwards and separated from a stack of aluminum sheets by the suction pads.

With a non-ferrous material, such as aluminum sheets, however, because the sheets cannot be separated using magnetism, with the material separation device in Japanese Laid-Open Patent Application H9-194056, a plurality of suction pads are controlled in order to take the aluminum sheets one by one from the stack without taking up double sheets.

SUMMARY

With the material separation device in the above-mentioned Japanese Laid-Open Patent Application H9-194056, however, since the suction pads are driven by air cylinders, only simple suction pad operation can be executed, and the incidence of taking up double sheets could not be sufficiently reduced.

In light of the problems encountered with the conventional material separation device discussed above, it is an object of the present invention to provide a material separation device and material separation method with which the incidence of taking up double sheets can be further reduced.

The material separation device pertaining to a first exemplary embodiment of the present invention comprises a placement component, a blower, a suction component, a driver, and a controller. A plurality of stacked sheets of material are placed on the placement component. The blower blows air at the sheets of material placed on the placement component to float at least part of the uppermost sheet. The suction component has a plurality of suction pads and uses these suction pads to chuck and hold the uppermost sheet of material from above in a state in which the air is being blown. The driver has an electric motor and uses this electric motor to drive the suction component up and down. The controller performs control so that the suction pads chucking the material are raised to a first specific position, the suction pads are stopped for a specific length of time at the first specific position in a state in which the air is stopped, and the suction pads are then raised to a second specific position.

Providing an electric motor allows control to be performed to raise the suction pads chucking the material to the first specific position with the driver, to stop the suction pads at the first specific position for a specific length of time in a state in which the air is stopped, and then to raise the suction pads to the second specific position with the driver.

Performing control such as this allows for a reduction in the incidence in the taking up of double sheets, particularly with a non-ferrous material (such as aluminum sheets). The term "double sheets" here is not limited to just two sheets of material, and also encompasses the movement of three or more sheets.

Also, there may be situations in which material other than the uppermost sheet is floated by the air, and stopping the suction pads for a specific length of time in a state in which the air is stopped ensures that there will be enough time for the material other than the uppermost sheet to fall, and this facilitates separation.

The material separation device pertaining to a second exemplary embodiment of the present invention is the material separation device pertaining to the first exemplary embodiment of the present invention, wherein the controller performs control so that the speed at which the suction pads are raised to the first specific position after the material has been chucked will be lower than the speed at which the suction pads are raised from the first specific position to the second specific position.

Performing control in this way makes it easier to separate the material because the speed at which the suction pads are raised to the first specific position after the material has been chucked can be lowered.

Also, since the speed at which the suction pads are raised from the first specific position to the second specific position can be raised, the processing speed can be increased.

The material separation device pertaining to a third exemplary embodiment of the present invention is the material separation device pertaining to the first exemplary embodiment of the present invention, further comprising a first input component. With this first input component, input is performed to change the acceleration or the speed when the suction pads are raised to the first specific position after the material has been chucked. The controller performs control so that the suction pads are raised at the inputted speed or acceleration.

Thus providing a first input component allows the user to change the speed or acceleration to suit the situation and the type of material, so the separation of the material can be carried out under the proper conditions. For instance, when a rustproof oil that coats the material has such a high viscosity that it is difficult to separate the material, then the speed can be lowered or the acceleration reduced to reduce the incidence of taking up double sheets.

Also, when a rustproofing oil has a low enough viscosity for the material to be easily separated, then the speed can be raised or the acceleration increased to raise the processing speed.

The material separation device pertaining to a fourth exemplary embodiment of the present invention is the material separation device pertaining to any of the first to third exemplary embodiments of the present invention, further comprising a second input component. With this second input component, input is performed to change the acceleration of the suction pads from a stopped state when the suction pads are first stopped for a specific length of time at the first specific position and then raised to the second specific position. The controller performs control so that the suction pads are raised at the inputted acceleration from the stopped state.

Thus, providing a second input component allows the user to change the acceleration to suit the situation and the type of material, so the separation of the material can be carried out under the proper conditions. Specifically, when the material is difficult to separate because of a rustproofing oil or other such conditions, then the acceleration can be reduced to make it less likely that double sheets of the material will be taken up. Also, if the conditions are such that the material is easy to separate, then the acceleration can be increased to boost the processing speed.

The material separation method pertaining to a fifth exemplary embodiment of the present invention is a material separation method that makes use of a material separation device that drives suction pads up and down with electric motors, said method comprising a blowing step, a chucking step, a first raising step, a stopping step, and a second raising step. In the blowing step, air is blown at a plurality of stacked sheets of material to float at least part of the uppermost sheet. In the chucking step, the uppermost sheet is chucked and held with the suction pads from above in a state in which the air is being blown. In the first raising step, the suction pads that have chucked the material are raised to a first specific position. In the stopping step, the suction pads are stopped for a specific length of time in the first specific position in a state in which the air has been stopped. In the second raising step, the suction pads that have stopped for the specific length of time are raised to the second specific position.

Performing the operation in this way makes it less likely that double sheets will be taken up, particularly with a non-ferrous material.

Also, there may be situations in which material other than the uppermost sheet is floated by the air, and stopping the suction pads for a specific length of time in a state in which the air is stopped ensures that there will be enough time for the material other than the uppermost sheet to fall, and this facilitates separation.

The present invention provides a material separation device and material separation method with which the taking up of double sheets is less likely to occur.

DETAILED DESCRIPTION OF EXEMPLARY EMBODIMENTS

The material separation device in an exemplary embodiment of the present invention will now be described through reference to the drawings.

Configuration of Material Separation Device

Figure 1:
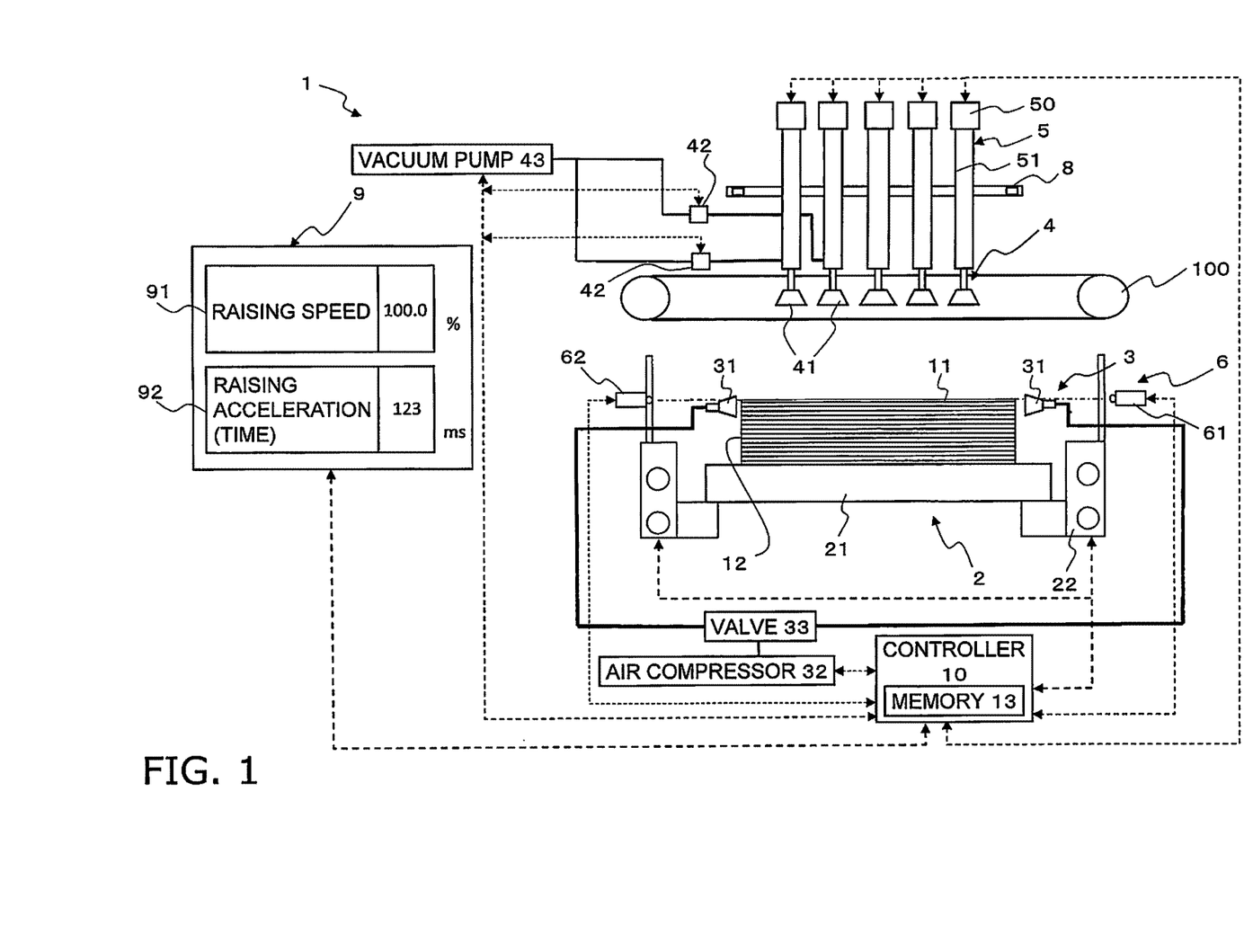
FIG. 1 is a simplified diagram of the configuration of the material separation device in an exemplary embodiment pertaining to the present invention.

FIG. 1 is a diagram of the configuration of the material separation device 1 in this exemplary embodiment. As shown in the drawing, the material separation device 1 mainly comprises a placement component 2, a blower 3, a suction component 4, a suction pad driver 5, a position sensor 6, an interface component 9, and a controller 10.

The material separation device 1 separates one sheet of material from a stack of a plurality of sheets of material. Examples of the material sheets separated with the material separation device 1 include aluminum, magnesium, and other such non-ferrous materials. In this exemplary embodiment, aluminum sheets will be used as an example.

The material separation device 1 lifts one aluminum sheet 11 from a stack 12 of aluminum sheets 11 with the suction component 4, and moves it to an overhead conveyor 100. The conveyor 100 has a suction function, and conveys the aluminum sheet 11 separated by the material separation device 1 to the next device (such as a press device) while holding the sheet with suction.

The interface component 9 is used, for example, to input speed during the raising of suction pads 411 (discussed in detail below) of the suction component 4. The controller 10 controls the placement component 2, the blower 3, the suction component 4, and the suction pad driver 5 on the basis of input from the interface component 9 and sensing by the position sensor 6.

The components will now be described in order.

2. Placement Component

The placement component 2 has a placement table 21 and placement table drivers 22 that raise and lower the placement table 21.

The stack 12, consisting of a plurality of stacked aluminum sheets 11, is placed on the placement table 21. The placement table drivers 22 raise and lower the placement table 21.

As shown in FIG. 1, the placement table drivers 22 are disposed on the left and right sides of the placement table 21, and support the placement table 21 so that it can be raised and lowered.

The placement table drivers 22 has a hydraulic cylinder (not shown), a hydraulic circuit that is connected to the hydraulic cylinder, a pump that supplies hydraulic fluid to the hydraulic circuit, and so forth. The placement table 21 is raised and lowered by controlling the valves, pump, etc., of the hydraulic circuit of the placement table drivers 22 with the controller 10.

3. Blower

The blower 3 has a plurality of nozzles 31 that discharge air, an air compressor 32 that produces high-pressure air, and a valve 33 provided along the path between the nozzles 31 and the air compressor 32. The nozzles 31 are disposed facing each other on the left and right sides, near the upper end of the stack 12. The nozzles 31 discharge high-pressure air sideways near the upper end of the stack 12, and cause the uppermost aluminum sheet 11 to float. The air compressor 32 supplies highly compressed air to the nozzles 31. The valve 33 is provided between the air compressor 32 and the nozzles 31. The air compressor 32 is driven constantly, highly compressed air is discharged from the nozzles 31 when the valve 33 is switched on by the controller 10, and the discharge of highly compressed air from the nozzles 31 is halted when the valve 33 is switched off.

4. Suction Component

The suction component 4 has a plurality of suction pad components 41 that are aligned in the left and right direction and in the direction moving away from the viewer in FIG. 1, valves 42 that are connected to the suction pad components 41, and a vacuum pump 43 (see FIG. 1) that is connected to all of the valves 42. In FIG. 1, the valves 42 are not depicted for all of the suction pad components 41, in order to make the drawing easier to see.

Figures 2A, 2B:
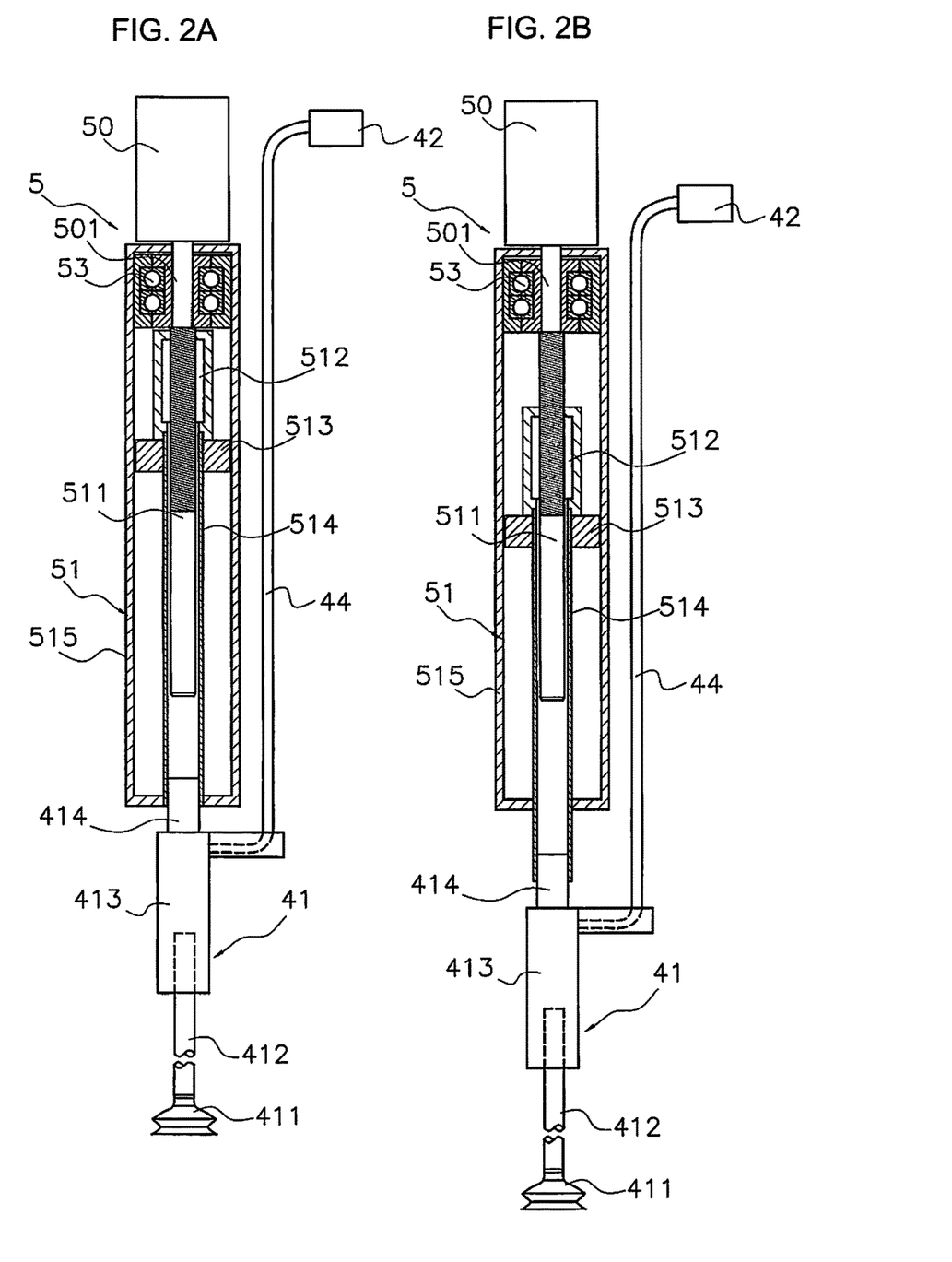
FIGS. 2A and 2B are cross sections illustrating a suction component and a driver in the material separation device in FIG. 1.

FIGS. 2A and 2B are partial cross sections of the configuration of the suction pad components 41 and the suction pad driver 5. FIG. 2A shows the state when the suction pad components 41 have moved upward, and FIG. 2B shows the state when the suction pad components 41 have moved downward.

As shown in FIGS. 2A and 2B, the suction pad components 41 each have a suction pad 411 that chucks the aluminum sheet 11, a pad support member 412 connected to the upper side of the suction pad 411, a tube connector 413 to which the upper end of the pad support member 412 is connected, and a drive connector 414 disposed on the upper side of the tube connector 413.

The suction pads 411 are molded from rubber or the like, and chuck the aluminum sheet 11. The pad support members 412 are hollow cylindrical members, and are linked to the space inside the suction pads 411. Tubes 44 that are linked to the valves 42 are connected to the tube connectors 413. The valves 42 are connected to the vacuum pump 43. The suction pads 411 are brought into contact with the upper face of the aluminum sheet 11, and the vacuum pump 43 is actuated, causing the air in the space inside the suction pads 411 to be drawn in by the vacuum pump 43 via the pad support members 412, the tube connectors 413, and the valves 42. Consequently, the aluminum sheet 11 is held by suction to the suction pads 411.

The drive connectors 414 connect the tube connectors 413 to the suction pad driver 5.

5. Suction Pad Driver

The suction pad driver 5 has a plurality of servo motors 50 and converters 51 that convert the rotary drive of the servo motors 50 into up and down drive. The servo motors 50, the converters 51, and the suction pad components 41 are disposed in that order, starting from the top.

The servo motors 50 are provided to the various suction pad components 41 and are used as a drive source for moving the suction pad components 41 up and down. The servo motors 50 are disposed so that their rotary axes coincide with the vertical direction.

The converters 51 each mainly have a ball screw 511 that is disposed coaxially with the servo motor 50, a nut 512, a restrictor 513 that restricts movement of the nuts 512 in the rotational direction, a cylindrical part 514 connected to the restrictor 513, and a housing 515 that covers the ball screw 511, the nut 512, the restrictor 513, and the cylindrical part 514.

The housings 515 are cylindrical in shape, and the servo motors 50 are disposed at their upper ends. Rotary shafts 501 of the servo motors 50 are supported rotatably in the housings 515 by bearings 53.

The ball screws 511 are disposed along the vertical direction, are disposed coaxially with and linked to the rotary shafts 501. The nuts 512 are inserted into the ball screws 511, and the threads on the inside of the nuts 512 mesh with the threads on the surface of the ball screws 511.

The restrictors 513 are linked to the nuts 512, and prevent the nuts 512 from turning along with the rotation of the ball screws 511. For example, the inner peripheral faces of the housings 515 are formed in a quadrangular shape in plan view, and the restrictors 513 are also formed in a quadrangular shape around the inner periphery of the housings 515.

The cylindrical parts 514 are disposed around the ball screws 511, in non-contact with the ball screws 511. The upper ends of the cylindrical parts 514 are connected to the restrictors 513, and the lower ends are connected to the drive connectors 414.

The housings 515 are supported above the placement component 2 by a support frame 8 (see FIG. 1).

With the above configuration, when the servo motors 50 are driven, the ball screws 511 rotate in the same direction. As shown in FIG. 2B, the nuts 512, which are prevented from co-turning by the restrictors 513, move downward along with the rotation of the ball screws 511. The cylindrical parts 514, which are linked via the restrictors 513 to the nuts 512, move downward, and the suction pad components 41 also move downward.

Also, the suction pad components 41 move upward when the rotational direction of the ball screws 511 is reversed.

6. Position Sensor

The position sensor 6 is a photoelectric sensor, and as shown in FIG. 1, has a projector 61 that emits light, and a light receiver 62 that receives the light projected from the projector 61. The projector 61 and the light receiver 62 are provided at the upper end of the stack 12, and are disposed flanking the stack 12 from the left and right sides.

When light from the projector 61 is blocked by the stack 12 and not received by the light receiver 62, it is detected that the uppermost sheet of the stack 12 has reached the sheet separation position, and a signal is sent to the controller 10. The sheet separation position here refers to the position at which the operation to separate the uppermost aluminum sheet 11 is commenced.

7. Controller

The controller 10 controls the hydraulic cylinders, hydraulic circuits, pumps, etc., of the placement table drivers 22, and moves the stack 12 up and down. The controller 10 stops the placement table 21 on the basis of sensing by the position sensor 6, drives the air compressor 32, and blows air from the nozzles 31 at the aluminum sheet 11.

The controller 10 drives the servo motors 50 to move the suction pads 411 downward, and after the suction pads 411 have come to a stop, drives the vacuum pump 43 and the valves 42 so that the aluminum sheet 11 is chucked by the suction pads 411.

The controller 10 has a memory 13. The memory 13 stores the motion initial set for the suction pads 411 (see FIG. 4; discussed below), etc.

The controller 10 performs control on the basis of the initially set motion, and carries out the separation of the aluminum sheet aluminum sheet 11 from the stack 12. Also, the controller 10 changes some of the initially set motion on the basis of the value inputted to the interface component 9 by the user, and performs control with the changed motion to carry out the separation of the aluminum sheet 11. The interface component 9 will be described after first describing the operation of the material separation device 1 in this exemplary embodiment.

8. Operation

The operation of the material separation device 1 in this exemplary embodiment will now described along with an example of a material separation method.

Figure 3:
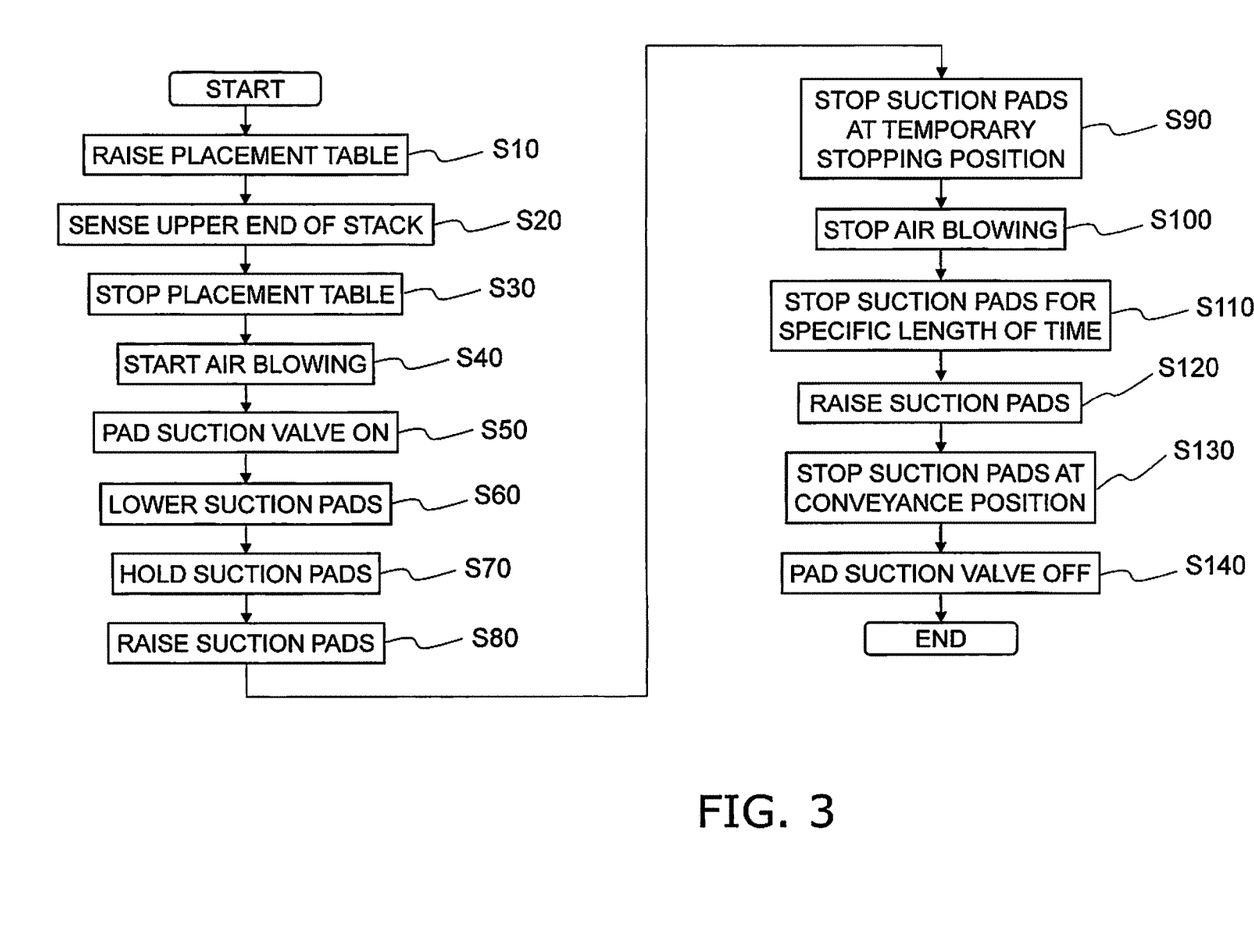
FIG. 3 is a flowchart of the operation for separating one aluminum sheet with the material separation device in FIG. 1.
Figure 4:
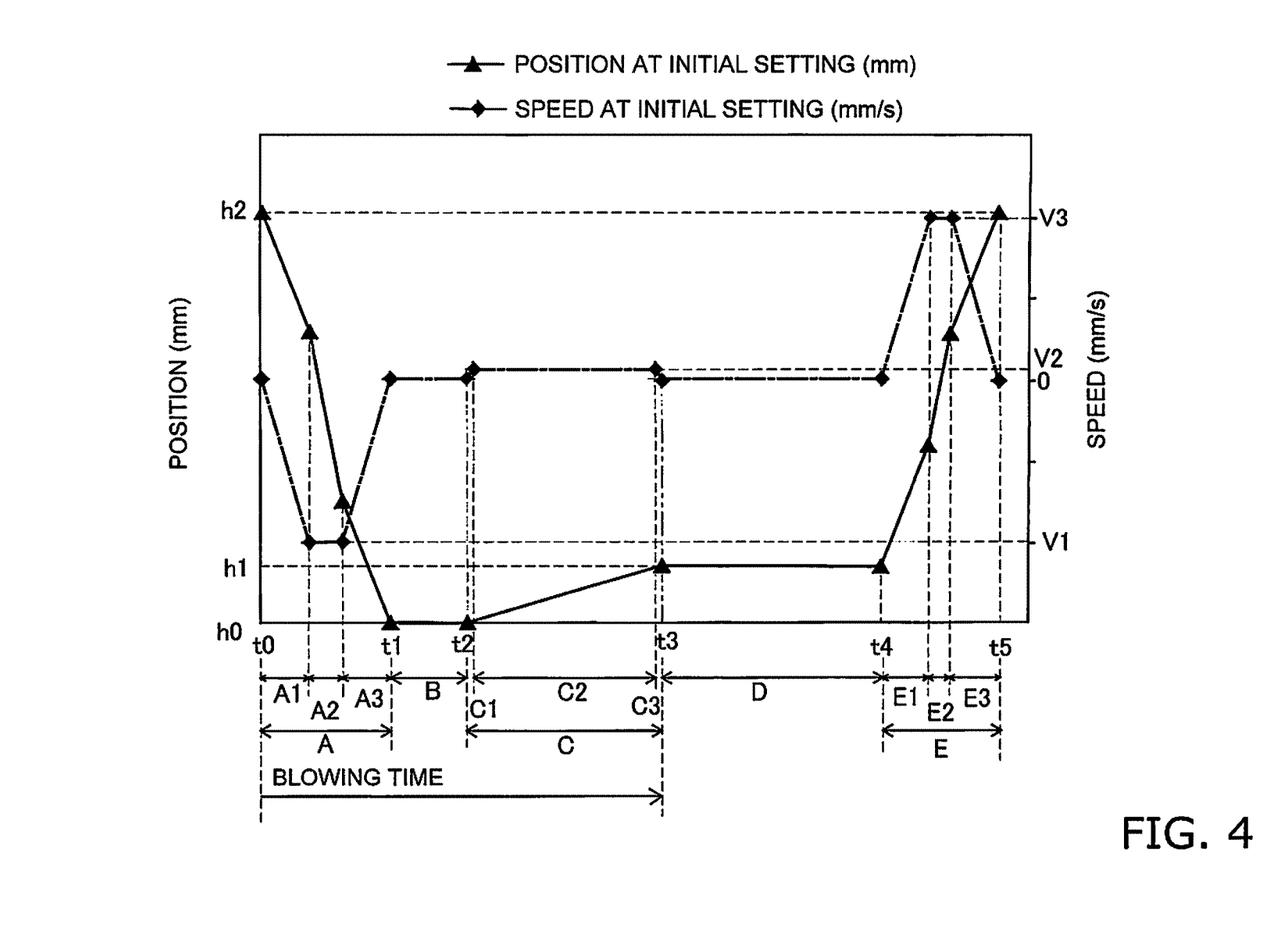
FIG. 4 is a graph of the change in speed and position of suction pads in the sheet separation operation in FIG. 3.

FIG. 3 is a flowchart illustrating the operation for separating aluminum sheets. FIG. 4 is a graph of the initially set motion of the suction pads 411, and shows the change in movement speed and position of the suction pads 411 when the aluminum sheets are separated at the initially set motion. FIGS. 5A to 5D are diagrams illustrating an example of the behavior of the suction pads 411 and the aluminum sheets 11.

In step S10, the controller 10 drives the placement table drivers 22 to raise the placement table 21. Then, when the position sensor 6 senses in step S20 that the upper end of the stack 12 has reached the sheet separation position, in step S30 the controller 10 stops the raising of the placement table 21.

Figure 5A:
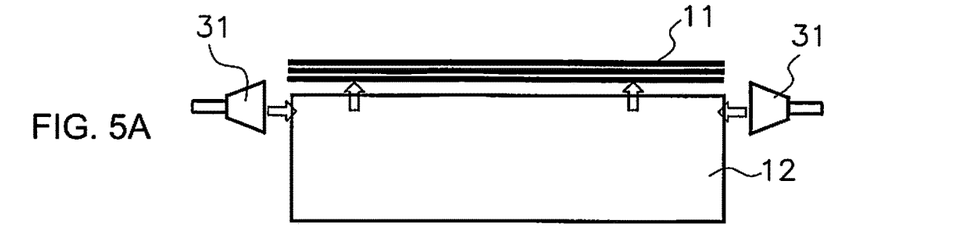
FIGS. 5A to 5D are diagrams illustrating an example of the operation of a suction pad and the behavior of aluminum sheets when the suction pad is used in the sheet separation operation in FIG. 3.

Then, in step S40, the controller 10 switches on the valve 33 of the blower 3 so that air is blown out of the nozzles 31. This operation floats the uppermost aluminum sheet 11 of the stack 12, as well as a few aluminum sheets 11 below the uppermost sheet, as shown in FIG. 5A. With the material separation device 1 in this exemplary embodiment, the nozzles 31 are provided on the left and right, and the entire aluminum sheets 11 are floated.

Then, in step S50, the controller 10 switches on the valves 42 to start drawing in the air inside the suction pads 411.

Figure 5B:
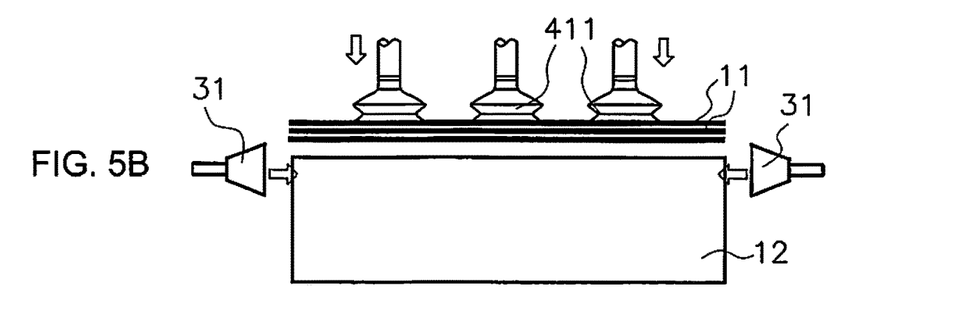

Then, in step S60, the controller 10 drives the servo motors 50 to lower the suction pads 411 from the conveyance position to the chucking position at a first speed V1, and to press the suction pads 411 against the uppermost floating aluminum sheet 11 as shown in FIG. 5B. This lowering of the suction pads 411 corresponds to a period A from time t0 to t1 in FIG. 4. Also, the chucking position is shown as h0 in FIG. 4, while the conveyance position is shown as h2.

When the suction pads 411 are lowered at the first speed V1, the servo motors 50 are controlled so that the suction pads 411 will first accelerate, then move at a constant speed, and then decelerate. That is, the suction pads 411 that are stopped at the conveyance position (h2) are lowered while accelerating up to the first speed V1. This acceleration up to the first speed V1 is shown as the period A1. Then, the servo motors 50 rotate at a constant speed, and the suction pads 411 are lowered at the first speed V1 during a period A2. After the period A2, the suction pads 411 are lowered while decelerating, stopping at the chucking position (h0). The chucking position (h0) corresponds to the position of the suction pads 411 shown in FIG. 5B.

Next, in step S70, the suction pads 411 are held at the chucking position (h0) until the time t2 in a state of being pressed against the aluminum sheet 11 in order to chuck the aluminum sheet 11. This holding of the state of the suction pads 411 is shown as the period B from the time to t1 to t2 in FIG. 4.

Figure 5C:
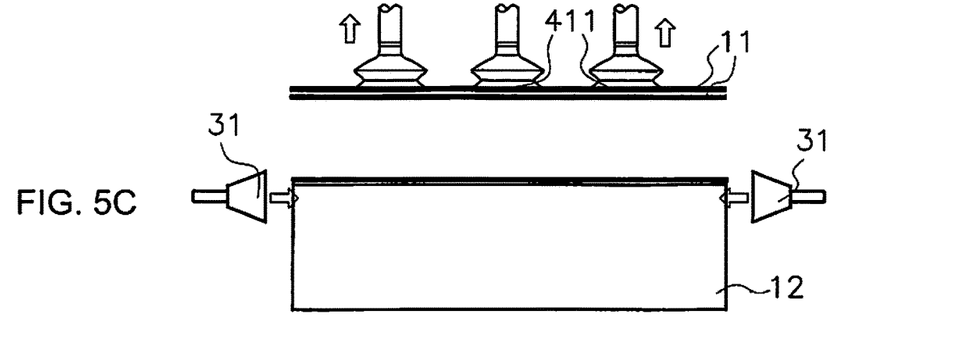

Then, in step S80 the controller 10 drives the suction pad driver 5 as shown in FIG. 5C to raise the suction pads 411 at a second speed V2 to a temporary stopping position. This raising of the suction pads 411 corresponds to a period C from the time t2 to t3 in FIG. 4. Also, the temporary stopping position is shown as h1 in FIG. 4.

In this period C, just as in the period A, the servo motors 50 are controlled so that the suction pads 411 accelerate, move at a constant speed, and then decelerate. That is, the suction pads 411 that are stopped at the chucking position (h0) are raised while accelerating up to the second speed V2, as shown in the period C1. Then, the servo motors 50 rotate at a constant speed, and the suction pads 411 rise while accelerating up to the second speed V2 during a period C2.

After this period C2, the suction pads 411 rise while decelerating, and stop at the temporary stopping position (h1).

Because the second speed V2 in this period C is lower than the first speed V1 in the period A and a third speed V3 in a period E (discussed below), the period C1 of acceleration and a period C3 of deceleration are shorter, as shown in the graph of speed change in FIG. 4.

Then, if the suction pads 411 reach the temporary stopping position (h1) in step S90, in step S100 the controller 10 switches off the valve 33 and stops the air blowing.

Figure 5D:
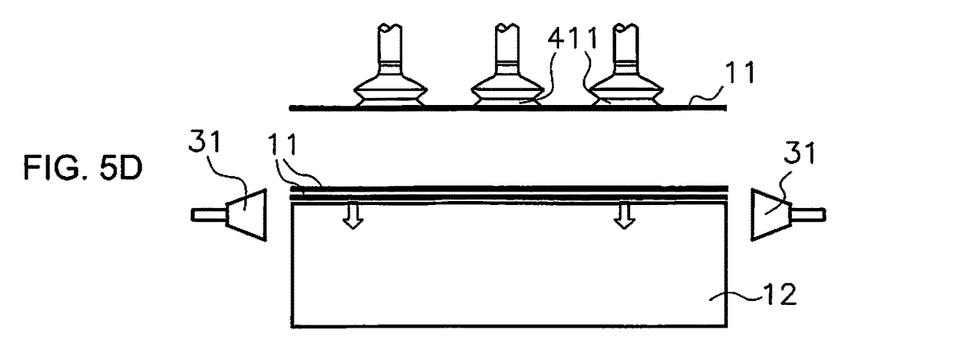

In step S110, the controller 10 then stops the suction pads 411 for a specific length of time at the temporary stopping position. Consequently, any other aluminum sheets 11 that had been floated by the air blowing aside from the uppermost aluminum sheet 11 (see FIG. 5C) drop down as shown in FIG. 5d. This temporary stopping of the suction pads 411 corresponds to a period D from the time t3 to t4 in FIG. 4.

Then, in step S120, the controller 10 raises the suction pads 411 at the third speed V3 to the conveyance position. Once the suction pads 411 reaches the conveyance position (h2), the controller 10 stops the movement of the suction pads 411 (step S130). The aluminum sheet 11 chucked to the suction pads 411 is then chucked to the conveyor 100. This raising of the suction pads 411 corresponds to the period E from the time t4 to t5 in FIG. 4.

In this period E, just as in the period A or the period C, the servo motors 50 are controlled so that the suction pads 411 accelerate, move at a constant speed, and then decelerate.

Specifically, as shown in the period E1, the suction pads 411 stopped at the temporary stopping position (h1) are raised while accelerating up to the third speed V3. Then, the servo motors 50 rotate at a constant speed, and the suction pads 411 are raised during period E2 at the third speed V3. After the period E2, in a period E3 the suction pads 411 are raised while decelerating, and stop at the conveyance position (h2). In this embodiment, the third speed V3 is set to be the same as the first speed V1, although the direction is the opposite. The first speed V1 and the third speed V3 may, however, be different.

After step S130, in step S140 the controller 10 switches off the valves 42 and releases the chucking of the aluminum sheet 11 by the suction pads 411. After being unchucked, the aluminum sheet 11 is conveyed by the conveyor 100.

As discussed above, just one aluminum sheet 11 out of the plurality of stacked aluminum sheets 11 is separated and conveyed.

The behavior of the aluminum sheets 11 shown in FIGS. 5A to 5D is just one example, and there are also situations in which just the uppermost aluminum sheet 11 is pulled up at the point in FIG. 5B, and other aluminum sheets 11 are not floated. Also, in FIG. 5C, as the suction pads 411 rise to the temporary stopping position (h1), other aluminum sheets 11 also rise along with the uppermost aluminum sheet 11, but sometimes they do not rise.

9. Interface Component

The interface component 9 shown in FIG. 1 is constituted by a touch panel, for example, and has a first input component 91 and a second input component 92. The first input component 91 is formed on the screen of the touch panel, and the second speed V2 in the period C can be inputted.

For example, the first input component 91 can be displayed as a percentage, and allows setting to a higher speed or a lower speed, with the second speed V2 that is initially set being 100%.

The second input component 92 is formed on the screen of the touch panel, and allows the input of acceleration in the period E1. As discussed above, the acceleration in the period E1 is the acceleration of the suction pads 411 from the stopped state at the temporary stopping position (h1) to the third speed V3. For instance, the second input component 92 allows the input of how long it takes to reach the third speed V3. Acceleration can be reduced by lengthening the time inputted to the second input component 92, and acceleration can be increased by shortening the time inputted to the second input component 92.

When the value inputted to the first input component 91 is reduced, the rate at which the suction pads 411 are pulled up after chucking the aluminum sheet 11 can be reduced. Therefore, it will be less likely that aluminum sheets 11 under the uppermost aluminum sheet 11 will stick to the uppermost aluminum sheet 11.

Also, lengthening the time inputted to the second input component 92 and thereby reducing the acceleration will slow the rate at which the suction pads 411 are pulled up from the temporary stopping position. Consequently, it will be less likely that any aluminum sheets 11 located at the temporary stopping position after sticking to the uppermost aluminum sheet 11 will follow after the uppermost aluminum sheet 11 even after the temporary stop.

Specifically, if double sheets of the aluminum sheets 11 are taken up with the initially set motion shown in FIG. 4, separation of the aluminum sheets 11 can be improved by inputting a smaller value to the first input component 91 and inputting a longer time to the second input component 92.

Also, the user can try changing the values inputted to the first input component 91 and the second input component 92 with a specific material and under specific conditions, allowing the separation of the material to be performed at the highest speed and acceleration at which double sheets will not be taken up, which means that the processing speed can be increased.

Figure 6:
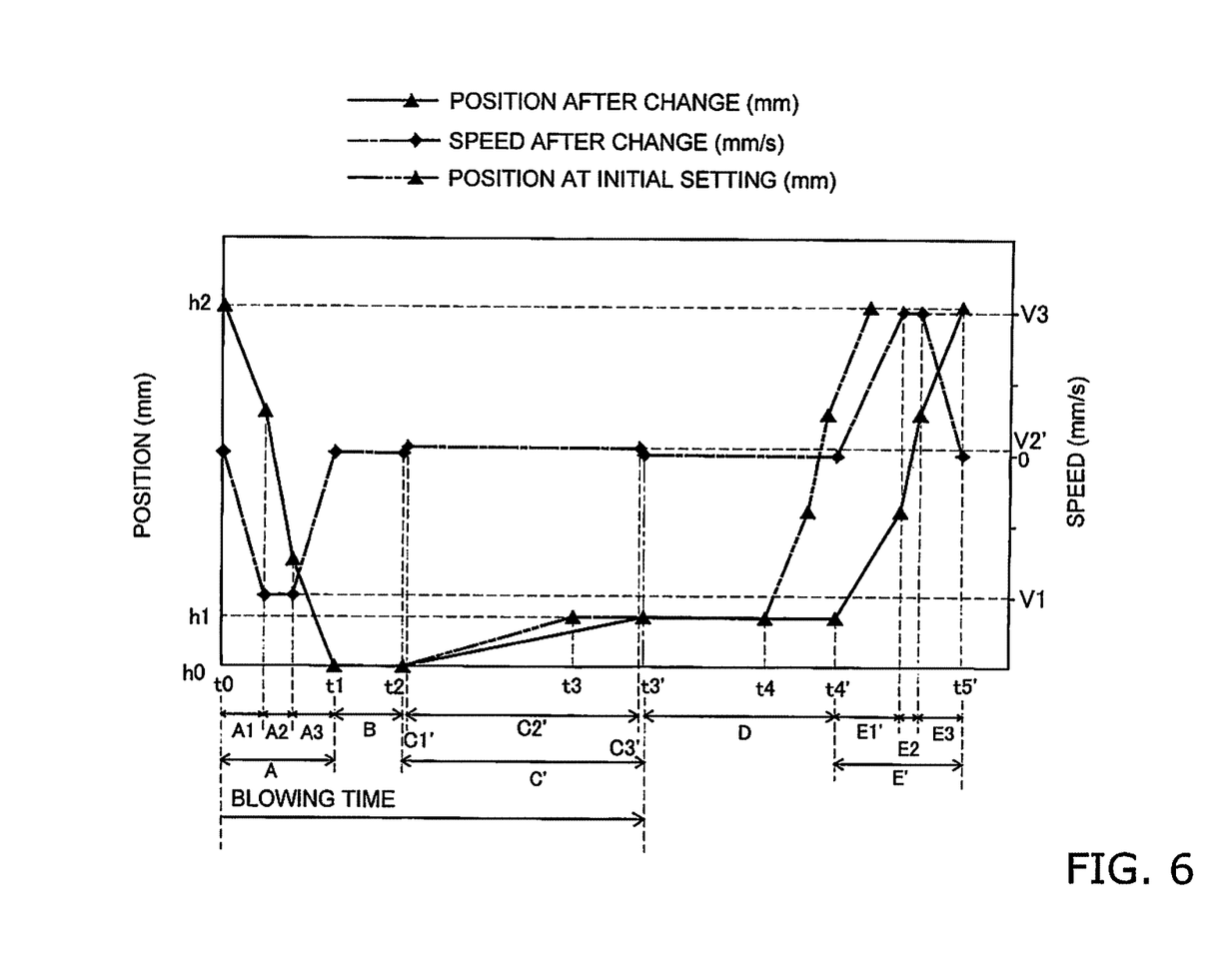
FIG. 6 is a graph of the change in the speed and position of the suction pads after the user has changed the speed and acceleration from the state in FIG. 4.

FIG. 6 shows the change in the speed and position of the suction pads 411 when a smaller value is inputted to the first input component 91 and a longer time is inputted to the second input component 92. In FIG. 6, the two-dot chain line indicates the change of the position of the suction pads 411 in the initially set, for the sake of comparison.

As shown in FIG. 6, since the second speed V2 is set to a lower speed V2', the duration (time t2 to t3') of a period C' from the chucking position (h0) until the temporary stopping position (h1) is reached is longer than the duration at the initial setting (time t2 to t3). More precisely, since the second speed V2 is changed to be lower, the period C2' is longer than the period C2. On the other hand, since the second speed V2 is changed to be lower, the time required for acceleration and deceleration is shorter, the period C1' is shorter than the period C1, and the period C3' is shorter than the period C3.

The duration between the times t3' and t4' in the period D is the same as that between the times t3 and t4 at the initial setting.

Also, inputting a longer time to the second input component 92 reduces the acceleration, and as shown in the period E1' in FIG. 6, the duration until the third speed V3 shown in the period E2' is reached will be longer than the initially set period E1. Accordingly, the duration of the period E' (time t4' to t5') will be longer than the initially set duration (time t4 to t5).

10. Main Features

The material separation device 1 in this exemplary embodiment comprises the placement component 2, the blower 3, the suction component 4, the suction pad driver 5 (an example of a driver), and the controller 10. A plurality of stacked aluminum sheets 11 (an example of a sheet-form material) are placed on the placement component 2. The blower 3 blows air at the aluminum sheets 11 placed on the placement component 2, and thereby floats at least part of the uppermost sheet of material. The suction component 4 has a plurality of suction pads 411, and the uppermost aluminum sheet 11 is held by suction by the suction pads 411 from above in a state in which the air is being blown. The suction pad driver 5 has the servo motors 50 (an example of electric motors), and these servo motors 50 are used to drive the individual suction components 4 up and down. The controller 10 performs control to raise the suction pads 411 chucking the aluminum sheet 11 to a temporary stopping position (h1) (an example of a first specific position), stop the suction pads 411 for a specific length of time at the temporary stopping position (h1) in a state in which the air is stopped, and then raise the suction pads 411 to the conveyance position (h2) (an example of a second specific position).

Because the servo motors 50 are provided, control can be performed in which the suction pads 411 chucking the aluminum sheet 11 are raised to the temporary stopping position (h1) by the suction pad driver 5, the suction pads 411 are stopped for a specific length of time at the temporary stopping position (h1) in a state in which the air is stopped, and then the suction pads 411 are raised to the conveyance position (h2) by the suction pad driver 5.

Performing control such as this reduces the incidence of taking up double sheets of material, and particularly a non-ferrous material such as an aluminum sheet.

Also, aluminum sheets 11 other than the uppermost one will sometimes be floated by the air, but enough time for the aluminum sheets 11 other than the uppermost one to fall can be ensured by stopping the suction pads 411 for a specific length of time in a state in which the air is stopped, which facilitates separation.

With the material separation device 1 in this exemplary embodiment, the controller 10 performs control so that the second speed V2 at which the suction pads 411 are raised to the temporary stopping position (h1) after chucking the aluminum sheet 11 will be lower than the third speed V3 at which the suction pads 411 are raised from the temporary stopping position (h1) to the conveyance position (h2).

Performing control in this way reduces the speed at which the suction pads 411 are raised to the temporary stopping position (h1) after chucking the aluminum sheet 11, which facilitates separation.

Also, since the speed at which the suction pads 411 are raised from the temporary stopping position (h1) to the conveyance position (h2) can be raised, the processing speed can be increased.

The material separation device 1 in this exemplary embodiment further comprises the first input component 91. The first input component 91 is used to input a change to the second speed V2 when the suction pads 411 are raised to the temporary stopping position (h1) after chucking the aluminum sheet 11. The controller 10 performs control so that the suction pads 411 will be raised at the inputted second speed V2.

Thus providing the first input component 91 allows the user to change the speed or acceleration to suit the state of the aluminum sheets 11, so the separation of the material can be carried out under the appropriate conditions. For example, if the aluminum sheets 11 are difficult to separate because of the viscosity of a rustproofing oil or other such conditions, a change to lower the second speed V2 can reduce the incidence of taking double sheets of the aluminum sheet 11.

Also, since the second speed V2 can be increased when the conditions afford easy separation of the material, this means that the processing speed can be increased.

The material separation device 1 in this exemplary embodiment further comprises the second input component 92. The second input component 92 is used to input a change to the acceleration of the suction pads 411 from a stopped state when the suction pads 411 are raised to the conveyance position (h2) after stopping for a specific length of time at the temporary stopping position (h1). The controller 10 performs control so that the suction pads will be raised from a stopped state at the inputted acceleration.

Thus, providing the second input component 92 allows the user to change the acceleration to suit the state of the aluminum sheets 11, so the separation of the material can be carried out under the appropriate conditions. For example, if the aluminum sheets 11 are difficult to separate because of the viscosity of a rustproofing oil or other such conditions, a change to lower the acceleration can reduce the incidence of taking double sheets of the aluminum sheet 11. Also, since the acceleration can be increased when the conditions afford easy separation of the material, this means that the processing speed can be increased.

The material separation method in this exemplary embodiment is a method that makes use of a material separation device that drives the suction pads 411 up and down by means of the servo motors 50 (an example of electric motors), comprising step S40 (an example of a blowing step), steps S60 and S70 (examples of a chucking step), steps S80 and S90 (examples of a first raising step), steps S100 and S110 (examples of a stopping step), and steps S120 and S130 (examples of a second raising step). Step S40 (an example of a blowing step) involves blowing air at a plurality of stacked aluminum sheets 11 (an example of a sheet-form material) to float at least part of the uppermost aluminum sheet 11. Steps S60 and S70 (examples of a chucking step) involve holding the uppermost aluminum sheet 11 by suction from above with the suction pads 411 in a state in which air is being blown. Steps S80 and S90 (examples of a first raising step) involve raising the suction pads 411 chucking the aluminum sheet 11 to the temporary stopping position (h1) (an example of a first specific position). Steps S100 and S110 (examples of a stopping step) involve stopping the suction pads 411 for a specific length of time at the temporary stopping position in a state in which the air is stopped. Steps S120 and S130 (examples of a second raising step) involve raising the suction pads 411 that have been stopped for a specific length of time to a conveyance position (an example of a second specific position).

Performing the operation in this way reduces the incidence of taking up double sheets, particularly with a non-ferrous material.

Also, aluminum sheets 11 other than the uppermost one will sometimes be floated by the air, but enough time for the material other than the uppermost sheet to fall can be ensured by stopping the suction pads 411 for a specific length of time in a state in which the air is stopped, which facilitates separation.

Other Exemplary Embodiments

An exemplary embodiment of the present invention was described above, but the present invention is not limited to or by the above exemplary embodiment, and various modifications are possible without departing from the gist of the invention.

With the material separation device 1 in the above exemplary embodiment, the configuration was such that the second speed V2 could be changed at the first input component 91, but the acceleration may be changed instead of the speed. Specifically, an input may be performed to change the acceleration in the period C1 up until the second speed V2 is reached.

In the above exemplary embodiment, the first input component 91 and the second input component 92 were provided, but just one of these may be provided. However, a change in the lifting speed in the period C immediately after the aluminum sheet 11 has been chucked is believed to be more effective at separating the aluminum sheets 11 than a change in the acceleration in the period E1, so it is preferable to provide the first input component 91.

With the material separation device 1 in the above exemplary embodiment, the aluminum sheets 11 were used as an example of a sheet-form material, but the material is not limited to the aluminum sheets 11, and may instead be magnesium sheets or the like.

Also, when separability varies with the type of material, double take-up can be suppressed and the processing speed can be raised as much as possible by changing the values inputted to the first input component 91 and the second input component 92 according to the type of material.

In the above exemplary embodiment, the first input component 91 and the second input component 92 were configured so that numerical values could be inputted with a touch panel, but may instead be configured so that the numerical values for speed and acceleration can be changed with a slider, a dial, or the like.

In the above exemplary embodiment, a value for the proportion (%) of the initially set speed was inputted to the first input component 91, but this is not the only option, and a value for the speed may be inputted. Furthermore, the clock time t3 may be inputted; in other words, what is important is that the speed can be changed.

In the above exemplary embodiment, the time it took to reach the third speed V3 was inputted to the second input component 92, but this is not the only option, and a value for the acceleration may be inputted instead. Also, a proportion (%) may be inputted to the first input component 91 using the initially set acceleration value as 100%; in other words, what is important is that the acceleration value can be changed.

In the above exemplary embodiment, servo motors were used as an example of an electric motor, but an inverter motor or the like may be used instead.

In the above exemplary embodiment, hydraulic cylinders were used for the placement table drivers 22, but servo motors may be used instead.

The material separation device and material separation method of the present invention have the effect of allowing a further reduction in the incidence of double take-up, and are particularly useful in separating sheets of aluminum, magnesium, and other non-ferrous materials.

The invention claimed is:

1. A material separation device, comprising:
a placement component on which a plurality of sheets of material are stackable;
a blower configured and arranged so as to blow air toward at least an upper end of the sheets of material stacked on the placement component;
a suction component including a plurality of suction pads, the suction component being configured to use the suction pads to chuck and hold the uppermost sheet of material from a chucking position above the uppermost sheet;

a driver including an electric motor, the driver being configured to use the electric motor to drive the suction pads up and down; and a controller configured to control operations of the placement component, the blower, the suction component, and the driver;

the controller being configured to control the blower to start blowing the air to float at least part of the uppermost sheet before the suction component chucks and holds the uppermost sheet from the chucking position, and the controller being further configured to successively control the driver to raise the suction pads chucking the material from the chucking position to a first position higher than the chucking position, control the blower to stop the blowing of the air, control the driver to hold the suction pads for a predetermined length of time at the first position in a state in which the air blowing is stopped, and then control the driver to raise the suction pads from the first position to a second position higher than the first position, the controller controlling a speed at which the suction pads are raised from the chucking position to the first position after the material has been chucked to be less than a speed at which the suction pads are raised from the first position to the second position.

2. The material separation device according to claim 1, further comprising an input component to input a change to an acceleration of the suction pads from a stopped state when the suction pads are raised from the first position to the second position after being stopped at the first position for the predetermined length of time, the controller controlling the suction pads to be raised at the inputted acceleration from the stopped state.

3. The material separation device according to claim 1, wherein the blower includes a pair of nozzles arranged facing each other from opposite sides of the placement component.

4. The material separation device according to claim 1, wherein the placement component includes a placement table and a placement table driver configured to raise and lower the placement table.

5. A material separation device, comprising:

a placement component on which a plurality of sheets of material are stackable;

a blower configured and arranged so as to blow air toward at least an upper end of the sheets of material stacked on the placement component;

a suction component including a plurality of suction pads, the suction component being configured to use the suction pads to chuck and hold the uppermost sheet of material from a chucking position above the uppermost sheet;

a driver including an electric motor, the driver being configured to use the electric motor to drive the suction pads up and down;

a controller configured to control operations of the placement component, the blower, the suction component, and the driver; and a first input component to input a change to an acceleration or a speed at which the suction pads are raised from the chucking position to a first position higher than the chucking position after the material has been chucked, the controller being configured to control the blower to start blowing the air to float at least part of the uppermost sheet before the suction component chucks and holds the uppermost sheet from the chucking position, and the controller being further configured to successively control the driver to raise the suction pads chucking the material from the chucking position to the first position at the inputted speed or acceleration, control the blower to stop the blowing of the air, control the driver to hold the suction pads for a predetermined length of time at the first position in a state in which the air blowing is stopped, and then control the driver to raise the suction pads from the first position to a second position higher than the first position.

6. The material separation device according to claim 5, further comprising a second input component to input a change to an acceleration of the suction pads from a stopped state when the suction pads are raised from the first position to the second position after being stopped at the first position for the predetermined length of time, the controller controlling the suction pads to be raised at the inputted acceleration from the stopped state.

7. A material separation device, comprising:

a placement component on which a plurality of sheets of material are stackable;

a blower configured and arranged so as to blow air toward at least an upper end of the sheets of material stacked on the placement component;

a suction component including a plurality of suction pads, the suction component being configured to use the suction pads to chuck and hold the uppermost sheet of material from a chucking position above the uppermost sheet;

a driver including an electric motor, the driver being configured to use the electric motor to drive the suction pads up and down;

a controller configured to control operations of the placement component, the blower, the suction component, and the driver; and an input component, the controller being configured to control the blower to start blowing the air to float at least part of the uppermost sheet before the suction component chucks and holds the uppermost sheet from the chucking position, and the controller being further configured to successively control the driver to raise the suction pads chucking the material from the chucking position to a first position higher than the chucking position, control the blower to stop the blowing of the air, control the driver to hold the suction pads for a predetermined length of time at the first position in a state in which the air blowing is stopped, and then control the driver to raise the suction pads from the first position to a second position higher than the first position, the input component being configured to input a change to an acceleration of the suction pads at which the suction pads are raised from the first position to the second position after being stopped at the first position for the predetermined length of time, the controller controlling the suction pads to be raised at the inputted acceleration from the stopped state.

8. A material separation method that makes use of a material separation device that drives suction pads up and down with electric motors, the material separation method comprising:
- a blowing step of using a blower to blow air toward at least an upper end of a plurality of stacked sheets of material to float at least part of an uppermost sheet of the stacked sheets;
- a chucking step of moving the suction pads to a chucking position above the uppermost sheet after the blowing step has been started and chucking and holding the uppermost sheet with the suction pads in a state in which the air is being blown to float the at least part of the uppermost sheet;
- a first raising step of raising the suction pads that have chucked the material from the chucking position to a first position that is higher than the chucking position;
- a stopping step of stopping the blower and holding the suction pads for a predetermined length of time in the first position in a state in which the air has been stopped and the material remains held by the suction pads;
- a second raising step of raising the suction pads from the first position to a second position higher than the first position after the suction pads have stopped for the predetermined length of time at the first position; and
- a speed controlling step of controlling a speed at which the suction pads are raised from the chucking position to the first position after the material has been chucked to be less than a speed at which the suction pads are raised from the first position to the second position.

* * * * *